US007203960B1

(12) United States Patent
Painter

(10) Patent No.: US 7,203,960 B1
(45) Date of Patent: Apr. 10, 2007

(54) ANTI-VIRUS METHOD AND SYSTEM GUARANTEEING A MAXIMUM DELAY FOR STREAMING DATA

(75) Inventor: Mark Wendell Painter, Fremont, CA (US)

(73) Assignee: Trend Micro, Inc. (JP)

( * ) Notice: Subject to any disclaimer, the term of this patent is extended or adjusted under 35 U.S.C. 154(b) by 815 days.

(21) Appl. No.: 10/600,059

(22) Filed: Jun. 20, 2003

(51) Int. Cl.
*G06F 21/00* (2006.01)
(52) U.S. Cl. .......................................... 726/22; 726/24
(58) Field of Classification Search ................ 726/22, 726/23, 24, 251; 713/188
See application file for complete search history.

(56) References Cited

U.S. PATENT DOCUMENTS 6,006,329 A * 12/1999 Chi .............................. 726/24
6,412,022 B1 * 6/2002 Kumpf et al. .................. 710/1

* cited by examiner

*Primary Examiner*—Gilberto Barrón, Jr.
*Assistant Examiner*—Roderick Tolentino
(74) *Attorney, Agent, or Firm*—Beyer Weaver LLP

(57) ABSTRACT

The present application describes an anti-virus network system and method guaranteeing a maximum scan delay for streaming data. The maximum scan period can be predetermined or dynamically calculated. The time to scan an incoming data stream is estimated and compared against the maximum scan time. If the estimated scan time does not exceed the maximum scan time, then the incoming data stream is scanned for computer virus otherwise the data stream is transmitted without the virus scan.

34 Claims, 4 Drawing Sheets

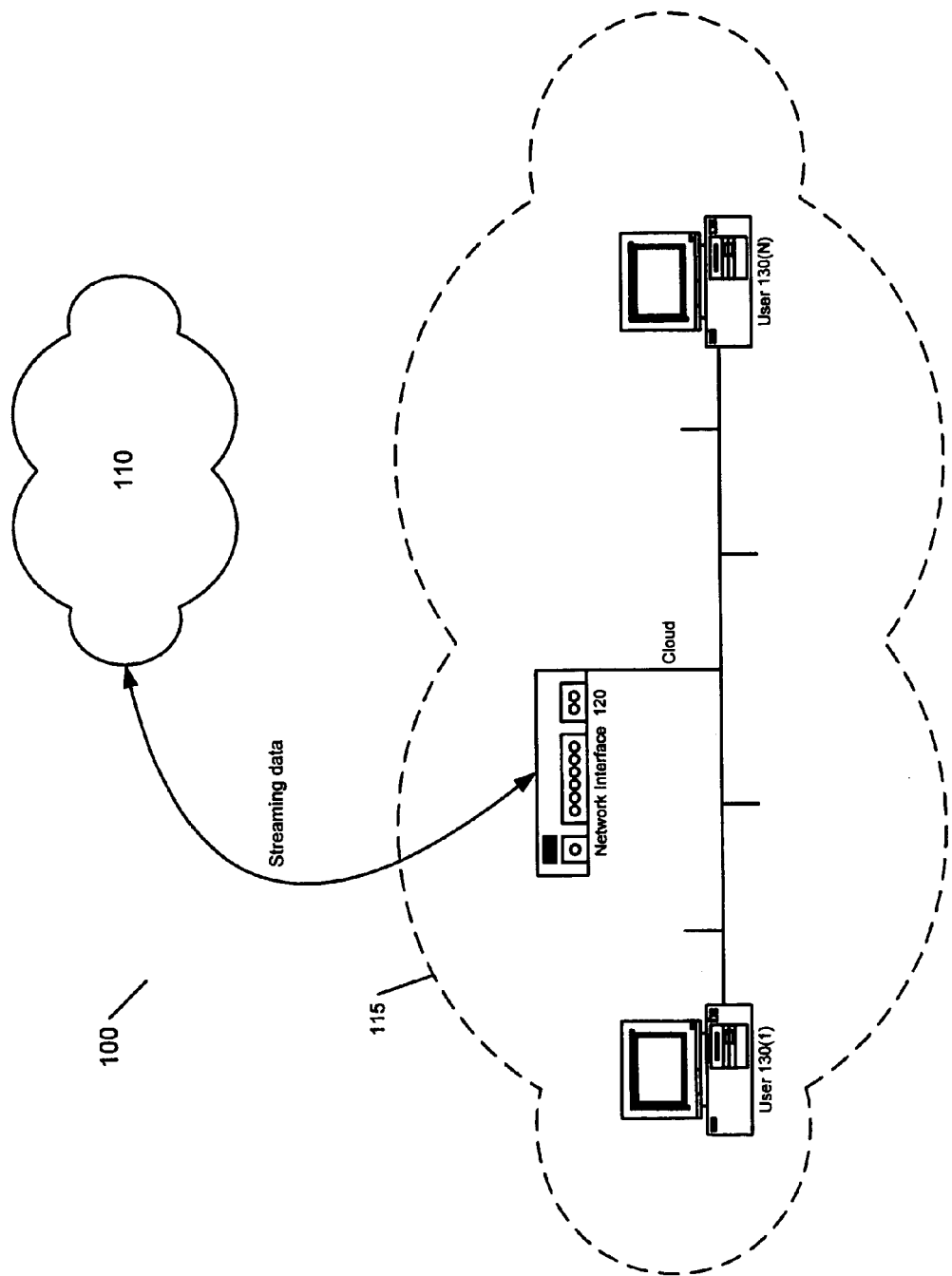

ously with
ANTI-VIRUS METHOD AND SYSTEM GUARANTEEING A MAXIMUM DELAY FOR STREAMING DATA

TECHNICAL BACKGROUND

1. Field of the Invention

The present application generally relates to an anti-virus system and method, and more particularly, to anti-virus system and method guaranteeing a maximum delay for streaming data.

2. Description of the Related Art

The Internet is an ideal mass medium for the spread of computer viruses because virtually every computer is connected to another computer or network either directly or indirectly. The Internet, with all its benefits and fascinations, is nonetheless an effective and efficient medium for an intentional spread of malicious code attack. It has been estimated that some fast-paced viruses can spread throughout the entire Internet within a matter of a few hours, if not effectively stopped. With the increase of data traffic in network environments, it is more likely that computer viruses will spread faster throughout the networks.

Generally, anti-virus software programs are deployed in the device nodes and servers within a network. The anti-virus software programs typically reside under the operating systems (e.g., Windows™) and scan the data stored within the network for computer viruses at the database level. However, scanning the data at the database level causes significant delays in detecting computer viruses. For streaming data, the general concern is to balance higher data throughput efficiency with the data security. Typically, a balance between the higher data throughput efficiency and data security is achieved by defining streaming data as not being able to carry computer viruses thus, the streaming data is not scanned for computer viruses. However, this assumption is no longer true because shockwave files (streaming data type) are known to carry computer viruses. Thus, now it is relatively easy to present computer viruses as streaming data type.

Typically, the data files are not scanned for computer viruses until the entire data file is downloaded by a computer system (e.g., network interface element). The problem with scanning of streaming data type for computer viruses is that typically, the streaming data files include a large amount of data and the data is presented to the user simultaneously with the downloading. The downloading of streaming data files requires a significant amount of time. Further, the scanning of the streaming data files, after the downloading, can require twice as much time before the data can be presented to the user. Current virus detection techniques do not guarantee a response time for virus detection of large data files such as streaming data. There is thus a need in the art for a method and system that guarantees a maximum delay for virus detection in large data streams.

SUMMARY

The present application describes an anti-virus network system and method guaranteeing a maximum scan delay for streaming data. The maximum scan period can be predetermined or dynamically calculated. The time to scan an incoming data stream is estimated and compared against the maximum scan time. If the estimated scan time does not exceed the maximum scan time, then the incoming data stream is scanned for a computer virus, otherwise the data stream is transmitted without the virus scan.

In some embodiments, a method for detecting a computer virus in a data stream is described. In some variations, the method includes estimating a scan time period required to scan the data stream, scanning the data stream to detect the computer virus if the estimated scan time period does not exceed a maximum scan time period, and transmitting the data stream if the estimated scan time period exceeds the maximum scan time period. In some variations, the maximum scan time period is predetermined. In some embodiments, the maximum scan time period is dynamically determined. In some variations, the method includes activating remedial actions upon detecting the computer virus in the data stream.

In some variations, the maximum scan time period is one of a plurality of maximum time periods. In some embodiments, the remedial action includes one or more of the following: logging an event of virus detection; stopping a transfer of the data stream if the transfer is still in progress; notifying users of the data stream; blocking a uniform resource locator corresponding to the data stream; advertising the uniform resource locator corresponding to the data stream to one or more network elements in a network; blocking one or more uniform resource locators similar to the uniform resource locator corresponding to the data stream; and initiating virus cleaning actions.

In some embodiments, a computing network is described. In some variations, the network includes at least one network element configured to estimate a scan time period required to scan an incoming data stream, scan the incoming data stream to detect a computer virus if the estimated scan time period does not exceed a maximum scan time period, and transmit the data stream if the estimated scan time period exceeds the maximum scan time period. In some variations, the network element is configured to activate remedial actions upon detecting the computer virus in the data stream.

The foregoing is a summary and shall not be used to limit the scope of the claims. The operations disclosed herein may be implemented in a number of ways, and such changes and modifications may be made without departing from this invention and its broader aspects. Other aspects, inventive features, and advantages of the present invention, as defined solely by the claims, are described in the non-limiting detailed description set forth below.

BRIEF DESCRIPTION OF DRAWINGS

FIG. 1A illustrates an exemplary network architecture guaranteeing a maximum delay for scanning streaming data for a virus according to an embodiment of the present invention.

Figure 1B:
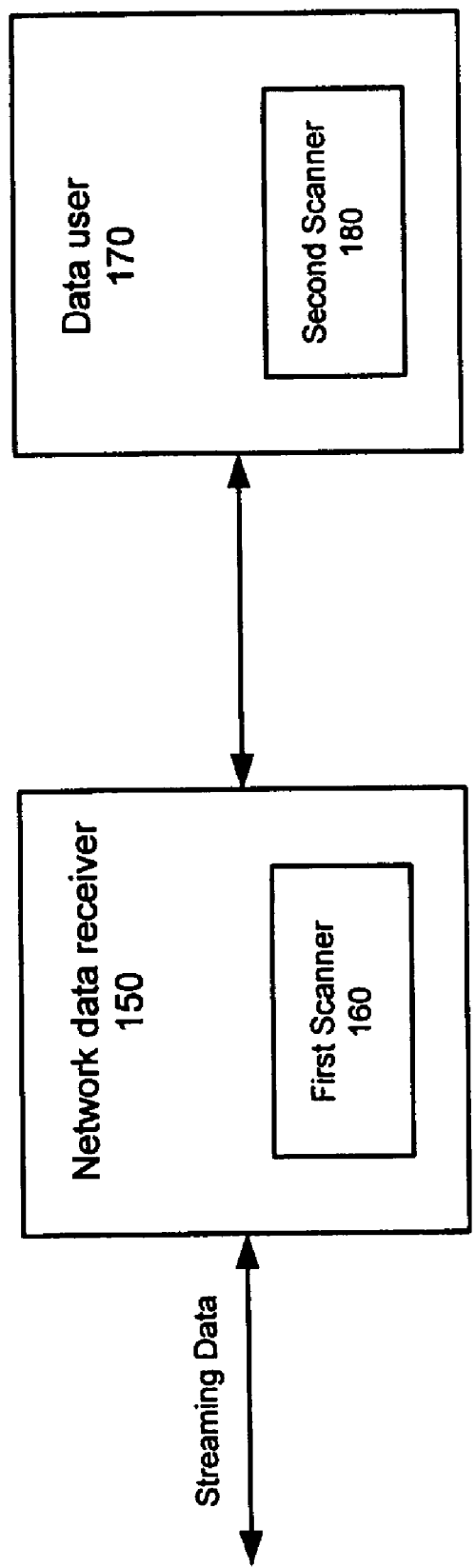
FIG. 1B illustrates an exemplary data interface architecture within a network guaranteeing a maximum delay for scanning streaming data for a virus according to an embodiment of the present invention.

All of these drawings are drawings of certain embodiments. The scope of the claims is not to be limited to the specific embodiments illustrated in the drawings and described below.

DETAILED DESCRIPTION OF EMBODIMENTS

The present application describes a system and method for scanning streaming data for virus detection while guaranteeing a maximum delay. In some embodiments, the streaming data is scanned using the process of deferred evaluation or lazy evaluation. The process of deferred evaluation focuses on waiting until the last possible moment to evaluate an expression, especially for the purposes of optimizing an algorithm that may not use the value of the expression. The deferred evaluation is useful when an expression is expensive or impossible to evaluate or may not need to be evaluated at all. The deferred evaluation is also useful for recursively defining infinite data structures. Since each level of recursion is evaluated only as it is needed, the data is only generated as it is consumed. The evaluation of the data structure can terminate when the consumption is completed.

The deferred evaluation can be extended so that the value of an expression is used interchangeably with the expression itself. This extension of the deferred evaluation and the sharing the value of the evaluated expression is used to implement call-by-need semantics where expressions are only evaluated once and then only if the evaluation is actually needed. All future instances of the expression are exchanged directly for the calculated value. In some cases, this can go beyond incremental optimization and actually reduce the computational complexity of an algorithm. The deferred evaluation requires the data used in the calculation to be available and meaningful at the time of evaluation. This ensures the timing of the deferred evaluation to fall within the window of opportunity for the expression to be evaluated correctly. If the expression is evaluated too soon, the data may not be available. If the expression is evaluated too late, the data may no longer be valid. The deferred evaluation gives an opportunity to delay the calculations until the data becomes available. It also provides the ability to instigate state-changing operations while delaying their execution until an appropriate time.

FIG. 1A illustrates an exemplary network architecture 100 guaranteeing a maximum delay for scanning streaming data for a virus according to an embodiment of the present invention. Network architecture 100 includes a network environment 110. The network environment 110 can be any network environment such as, for example, the Internet, an intranet, and various other networks. A user network 115 is coupled to the network environment 110. The user network 115 includes a network interface element 120. The network interface element provides data interface for user network 115 with other networks in the network environment 110. The user network 115 further includes N users, User 130(1)–(N). Users 130(1)–(N) are coupled to the network interface 120. While for purposes of illustration, a straight bus is shown in the present example, one skilled in the art will appreciate that users can be coupled via various network architectures known in the art. These architectures can include, for example, token ring, star, mesh, or the like. Further, although a single network interface is shown, the network interface can be integrated in the user system or more than one network interface element can be implemented to provide data interfaces for the user network 115. Similarly, the user network 115 can be any data network such as, for example, a metropolitan area network (MAN), a wide area network (WAN), a local area network (LAN), a wireless communication network for mobile phones and personal digital assistants (PDAs), and the like.

FIG. 1B illustrates an exemplary data interface architecture 140 within a network guaranteeing a maximum delay for scanning streaming data for a virus according to an embodiment of the present invention. The data interface architecture can be included in any network element of the user network 115. For example, the data interface architecture can be integrated in the network interface element 120. Alternatively, the data interface architecture can be implemented in individual user work stations. Further, the data interface architecture can be split among various network elements. The network data receiver 150 is the front-end data receiver for the user network 115. The network data receiver 150 initially receives the streaming data from other network elements (e.g., via the Internet). The network data receiver 150 includes a first scanner 160. The first scanner 160 is configured to scan the incoming streaming data for potential viruses. The first scanner 160 can be programmed to estimate the time required to scan the incoming streaming data and if the estimated time is less than a maximum scan time, then scan the incoming data stream for any potential virus. The first scanner can be any virus detection program configured to detect malicious code hidden in the incoming streaming data. The maximum scan time can be any programmed time period guaranteed by the user network 115.

Typically, the incoming data is presented in a packet (or frame) form. The data packets typically include a header and a data portion. The header portion of the data packet provides administrative information such as, for example, packet identification, type of data, destination identification, origination identification, packet size, file size, protocol related information, and the like. When an incoming data packet is received, the receiving network element (e.g., network interface 120) can determine the type of the data presented in the data packet and the size of the entire file. The receiving network element can then estimate scan time based on various factors such as, the amount of time required to receive the entire file based on the data speed of the network, network congestion, the performance of the hardware configured to scan the file, the overall performance demand of the network and other factors as determined by the network administrator. The estimated time to scan the incoming data file can then be compared with the maximum scan time guaranteed by the network.

The maximum scan time can be predetermined by the network administrator or dynamically calculated by network elements based on the network data traffic and network usage. For example, if the network users can tolerate longer delays in receiving streaming data, then the maximum scan time can be set for a longer period or vice versa. Various different maximum scan times can be defined based on the types of services provided by the network and the user demands. For example, if a user prefers higher data security versus network performance, then the maximum scan time can be set higher to ensure secured data transfer. Similarly, if the network receiving the incoming streaming data is an intermediary network for the incoming streaming data and the incoming streaming data is not used by any user within the receiving network (determined based on the destination identification), then the receiving network can use a lower maximum scan time to expedite the data transfer through the network so that the network performance can be preserved for other services provided by the network. The network administrator can determine appropriate maximum scan time policy based on the network configuration, types of services provided by the network and other similar factors.

The user network 115 includes a data user 170. The data user 170 can be any user that requests the incoming streaming data from the network such as, for example, an Internet user that requests a movie clip from a video web site. The data user 170 includes a second scanner 180. The second scanner 180 is configured to scan the incoming streaming data for potential viruses if the first scanner can not scan the streaming data because the estimated scan time exceeded the maximum scan time. The second scanner 180 can be any virus scan program deployed in the data user 170 such as, for example, virus scan programs installed on user work stations. While, for purposes of illustration, two scanners are shown and described, one skilled in the art will appreciate that depending upon the performance efficiency requirement of the network and the level of data security guaranteed, more virus scanners can be added at various stages of the user network 115.

Figure 2:
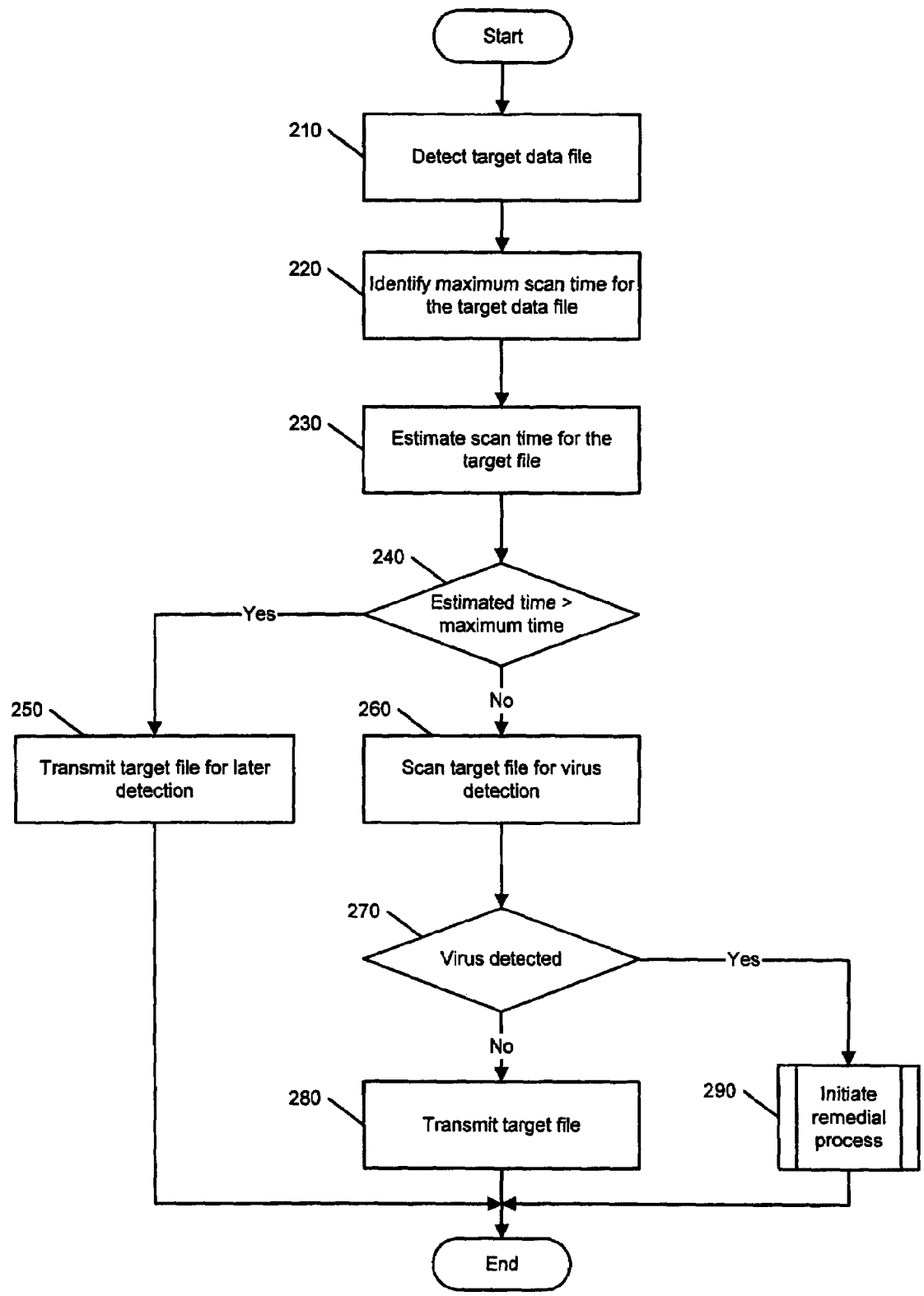
FIG. 2 illustrates a flowchart of exemplary steps performed during a process of scanning incoming streaming data while guaranteeing a maximum delay according to an embodiment of the present invention.

FIG. 2 illustrates a flowchart of exemplary steps performed during a process of scanning incoming streaming data while guaranteeing a maximum delay according to an embodiment of the present invention. For purposes of illustration, in the present example, various steps are described in particular order; however, when supported by accompanying hardware and software, these steps can be performed in any order, serially or in parallel.

Initially, the process detects a target data file (220). In the present example, the target data file is a streaming data file; however, the target data file type can be set to detect any type of incoming data. The type of file or resource depends on the Internet application protocol, i.e., the World Wide Web's protocol or the Hypertext Transfer Protocol (HTTP). The hypertext transfer protocol is a set of rules for exchanging files such as text, graphic images, sound, video, and other multimedia files on the World Wide Web. The incoming resource can be a Hypertext Markup Language (HTML) page, an image file, a program such as a common gateway interface application or Java™ applet, or any other file supported by HTTP. HTML is a set of markup symbols or codes inserted in a that is file intended for display on a World Wide Web browser page. The markup tells a web browser how to display a web page's words and images for the user. Each individual markup code is referred to as an element or a tag. Some elements come in pairs that indicate when some display effect is to begin and when it is to end.

The process identifies a maximum time allocated to scan the target data file (210). The maximum scan time can be predetermined by the network administrator or dynamically calculated according to the network data traffic. For example, if the network data traffic includes a higher percentage of streaming data and scanning the incoming data can cause network congestion or higher memory usage, then the maximum scan time can be set to a lower time period to minimize delays and the like. The maximum scan time can be a set of various scan times programmed according to the type of uniform resource locator (URL) provided in a user request. Similarly, the maximum scan time can be programmed according to the data users' needs such as, for example, if a user is willing to trade data security for better performance, then the maximum scan time can be set to a lower number or vice versa.

The process estimates the scan time for the target data file (230). The scan time can be estimated by analyzing HTTP headers and the initial content of the target file. The process determines whether the estimated time to scan the target data file is greater than the corresponding maximum scan time (240). The maximum scan time can be same for all data and file types or can be determined according to the maximum scan time policy set by the network administrator such as, for example, user based, file type based, URL based, and the like. If the estimated scan time of the target file is greater than the maximum scan time, then the process transmits the target data file to the data user without scanning for the viruses (250). When a data file is transmitted without the scan, the data file can be scanned by the operating system of the data user (e.g., by second scanner 180).

If the estimated scan time of the data file is less than the maximum scan time, then the process scans the target data file for virus detection (260). The target data file can be scanned using various virus scan techniques known in the art. The process determines whether a virus was detected during the scan (270). If no virus was detected, then the process transmits the file to the data user (280). If a virus was detected, the process proceeds to execute a predefined remedial process such as the one described in FIG. 3 (290). While separate scanners are defined, one skilled in the art will appreciate that the scanners can be integrated to function at different stages of data transfer in the network. Further, various steps described herein can be performed in any order or in parallel.

Figure 3:
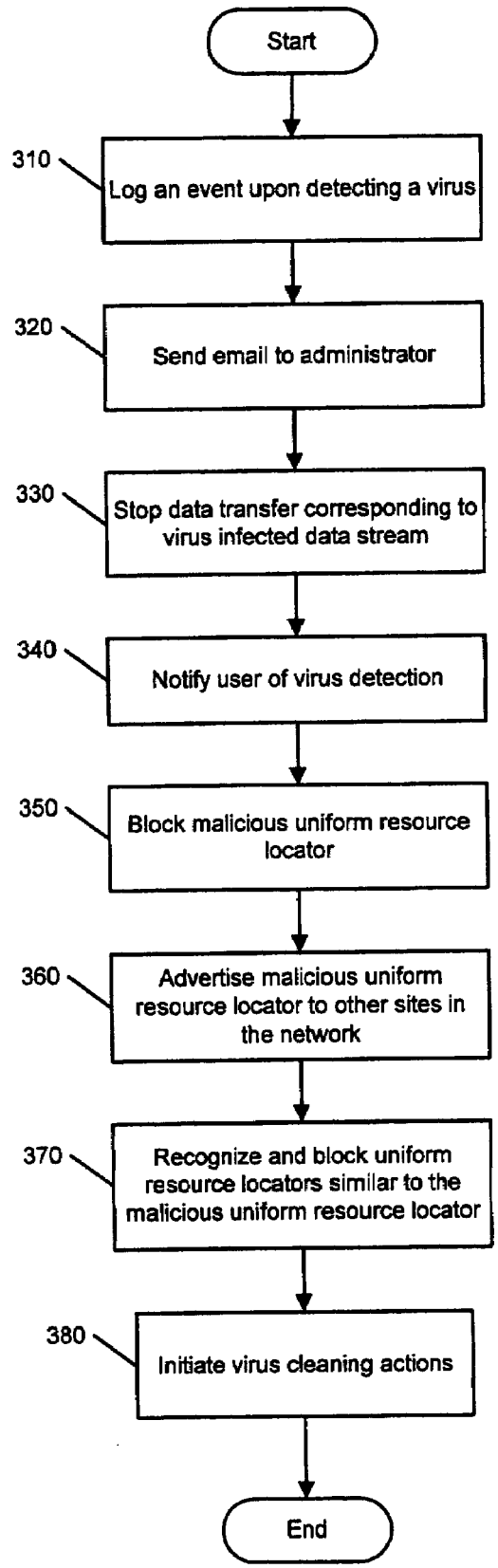
FIG. 3 illustrates a flowchart of exemplary steps performed during a remedial process after detecting a virus in the incoming data stream according to an embodiment of the present invention.

FIG. 3 illustrates a flowchart of exemplary steps performed during a remedial process after detecting a virus in the incoming data stream according to an embodiment of the present invention. For purposes of illustrations, various steps in the present example are described in a particular order; however, when supported by accompanying hardware and software, these steps can be performed in any order, serially or in parallel. One skilled in the art will appreciate that the process steps can be performed in any order or in parallel such as, for example, the process can stop the data transfer before taking any further notification (e.g., logging event, informing administrator). Similarly, the URLs can be blocked before advertising to other network elements and the like. Further, the remedial actions described herein can be selectively implemented according to the application such as, for example, in some application, upon virus detection, the process may inform only the network administrator and the network administrator can then selectively perform various remedial actions according to the network policy. In some other application, upon virus detection, the process can selectively perform one or more remedial actions described herein and the like.

Initially, upon detecting a virus, the process can log an event (310). The logging of an event can be performed using various techniques known in the art. The process can send a notification to the network administrator (320). The notification can be an email, a broadcast message and the like. Upon detection of virus, the process can stop the suspect data transfer if the data transfer is still in progress to prevent the virus from spreading through the network (330). Further, the process can inform the user of the corrupt data stream (340). Upon detection of virus, the process can block the malicious uniform resource locator (350). The blocking of uniform resource locator prevents the network from getting additional viruses from the same URL. The process can also advertise the malicious URL to other sites in the network (360). The advertisement of the URL can be done using various message exchange techniques known in the art (e.g., unicast, multicast, and broadcast). In some virus detection applications, upon detection of virus, the process can identify and block other URLs that are similar to the detected malicious URL (370). The other similar URLs can be blocked as a precaution to prevent similar virus attacks. Upon detection of virus, the process can initiate virus cleaning action using various virus cleaning techniques known in the art (380).

It would be apparent to one skilled in the art that the invention can be embodied in various ways and implemented in many variations. For instance, a network of computers is described herein in illustrating various embodiments of the invention. The invention is accordingly applicable in this and other types of networks such as, for example, a metropolitan area network (MAN), a wide area network (WAN), a local area network (LAN), a wireless communications networks for mobile phones and personal digital assistant (PDA) devices and the like. The method is also used in conjunction with the Internet Content Adaptation Protocol. Such variations are not to be regarded as a departure from the spirit and scope of the invention. In particular, the process steps of the method according to the invention include methods having substantially the same process steps as the method of the invention to achieve substantially the same results. Substitutions and modifications have been suggested in the foregoing detailed description and others will occur to one of ordinary skill in the art. All such modifications as would be clear to one skilled in the art are intended to be included within the scope of the following claims and their equivalents.

The section headings in this application are provided for consistency with the parts of an application suggested under 37 CFR 1.77 or otherwise to provide organizational cues. These headings shall not limit or characterize the invention(s) set out in any patent claims that may issue from this application. Specifically and by way of example, although the headings refer to a "Field of the Invention," the claims should not be limited by the language chosen under this heading to describe the so-called field of the invention. Further, a description of a technology in the "Description of Related Art" is not be construed as an admission that technology is prior art to the present application. Neither is the "Summary of the Invention" to be considered as a characterization of the invention(s) set forth in the claims to this application. Further, the reference in these headings, or elsewhere in this document, to "Invention" in the singular should not be used to argue that there is a single point of novelty claimed in this application. Multiple inventions may be set forth according to the limitations of the multiple claims associated with this patent specification, and the claims accordingly define the invention(s) that are protected thereby. In all instances, the scope of the claims shall be considered on their own merits in light of the specification but should not be constrained by the headings included in this application.

What is claimed is:

1. A method for detecting a computer virus in a data stream comprising:
   estimating a scan time period required to scan the data stream;
   scanning the data stream to detect at least one computer virus if the estimated scan time period does not exceed a maximum scan time period; and
   transmitting the data stream without the scanning if the estimated scan time period exceeds the maximum scan time period.

2. A method according to claim 1, wherein the maximum scan time period is predetermined.

3. A method according to claim 1, wherein the maximum scan time period is dynamically determined.

4. A method according to claim 1, further comprising:
   activating remedial action upon detecting the at least one computer virus in the data stream.

5. A method according to claim 1, wherein the data stream is included in a streaming data file.

6. A method according to claim 1, wherein the maximum scan time period is one of a plurality of maximum time periods.

7. A method according to claim 4, wherein the remedial action comprises:
   logging an event of virus detection.

8. A method according to claim 4, wherein the remedial action further comprises:
   stopping a transfer of the data stream if the transfer is still in progress.

9. A method according to claim 4, wherein the remedial action further comprises:
   notifying users of the data stream.

10. A method according to claim 4, wherein the remedial action further comprises:
    blocking a uniform resource locator corresponding to the data stream.

11. A method according to claim 10, wherein the remedial action further comprises:
    advertising the uniform resource locator corresponding to the data stream to one or more network elements in a network.

12. A method according to claim 4, wherein the remedial action further comprises:
    blocking one or more uniform resource locators similar to the uniform resource locator corresponding to the data stream.

13. A method according to claim 4, wherein the remedial action further comprises:
    initiating virus cleaning actions.

14. A network comprising:
    at least one network element configured to
    estimate a scan time period required to scan a data stream;
    scan the data stream to detect at least one computer virus if the estimated scan time period does not exceed a maximum scan time period; and
    transmit the data stream without scanning if the estimated scan time period exceeds the maximum scan time period.

15. A network according to claim 14, wherein the network element is further configured to
    activate remedial actions upon detecting the at least one computer virus in the data stream.

16. A network according to claim 14, wherein the maximum scan time period is predetermined.

17. A network according to claim 14, wherein the maximum scan time period is dynamically determined.

18. A network according to claim 14, wherein the data stream is included in a streaming data file.

19. A network according to claim 14, wherein the maximum scan time period is one of a plurality of maximum time periods.

20. A network element comprising:
    a processor;
    a data receiver coupled to the processor and configured to receive a data stream, wherein the processor is configured to
    estimate a scan time period required to scan the data stream;

scan the data stream to detect at least one computer virus if the estimated scan time period does not exceed a maximum scan time period; and transmit the data stream without scanning if the estimated scan time period exceeds the maximum scan time period.

21. A network element according to claim 20, wherein the maximum scan time period is predetermined.

22. A network element according to claim 20, wherein the maximum scan time period is dynamically determined.

23. A network element according to claim 20, wherein the processor is further configured to activate remedial actions upon detecting the at least one computer virus in the data stream.

24. A network element according to claim 20, wherein the data stream is included in a streaming data file.

25. A network element according to claim 20, wherein the maximum scan time period is one of a plurality of maximum time periods.

26. A computer program product encoded in one or more computer readable media, the computer program product comprising:

an execution sequence of instructions, the execution sequence of instructions is configured to estimate a scan time period required to scan a data stream;

scan the data stream to detect a computer virus if the estimated scan time period does not exceed a maximum scan time period; and transmit the data stream without scanning if the estimated scan time period exceeds the maximum scan time period.

27. A computer program product according to claim 26, wherein the execution sequence of instructions is further configured to:

activate remedial actions upon detecting the at least one computer virus in the data stream.

28. A computer program product according to claim 26, wherein the execution sequence of instructions is further configured to:

log an event of virus detection.

29. A computer program product according to claim 26, wherein the execution sequence of instructions is further configured to:

stop a transfer of the data stream if the transfer is still in progress.

30. A computer program product according to claim 26, wherein the execution sequence of instructions is further configured to:

notify users of the data stream.

31. A computer program product according to claim 26, wherein the execution sequence of instructions is further configured to:

block a uniform resource locator corresponding to the data stream.

32. A computer program product according to claim 26, wherein the execution sequence of instructions is further configured to:

advertise the uniform resource locator corresponding to the data stream to one or more network elements in a network.

33. A computer program product according to claim 26, wherein the execution sequence of instructions is further configured to:

block one or more uniform resource locators similar to the uniform resource locator corresponding to the data stream.

34. A computer program product according to claim 26, wherein the execution sequence of instructions is further configured to:

initiate virus cleaning actions.

* * * * *